(12) United States Patent
Wang et al.

(10) Patent No.: US 6,522,447 B2
(45) Date of Patent: Feb. 18, 2003

(54) OPTICAL LIMITING DEVICE AND METHOD OF PREPARATION THEREOF

(75) Inventors: Hsing-Lin Wang, Los Alamos, NM (US); Su Xu, Santa Clara, CA (US); Duncan W. McBranch, Santa Fe, NM (US)

(73) Assignee: The Regents of the University of California, Los Alamos, NM (US)

( * ) Notice: Subject to any disclaimer, the term of this patent is extended or adjusted under 35 U.S.C. 154(b) by 36 days.

(21) Appl. No.: 09/872,218

(22) Filed: May 31, 2001

(65) Prior Publication Data

US 2002/0182388 A1 Dec. 5, 2002

(51) Int. Cl.$^7$ ............................. G02F 1/03; G02F 1/07
(52) U.S. Cl. ...................... 359/241; 359/885; 252/582
(58) Field of Search ................... 359/241, 248, 359/321; 250/216; 252/582; 428/690, 917

(56) References Cited

U.S. PATENT DOCUMENTS

| | | | |
|---|---|---|---|
| 5,080,469 A | | 1/1992 | McCaon et al. ............ 359/354 |
| 5,283,697 A | | 2/1994 | Tutt et al. ................. 359/885 |
| 5,391,329 A | * | 2/1995 | Dougherty et al. .......... 264/1.7 |
| 5,568,496 A | * | 10/1996 | Justus et al. ................. 372/11 |
| 5,741,442 A | * | 4/1998 | McBranch et al. ......... 252/528 |
| 5,805,326 A | * | 9/1998 | Snow et al. ............... 359/241 |
| 6,057,406 A | | 5/2000 | Pojman et al. ............... 526/87 |
| 6,134,045 A | | 10/2000 | Jiang et al. ................ 359/321 |
| 6,143,045 A | * | 10/2000 | Jiang et al. ................ 359/321 |
| 6,262,830 B1 | * | 7/2001 | Scalora ..................... 359/248 |

OTHER PUBLICATIONS

S. Xu et al., "Toward the Development of Solid–State Optical Limiting Devices," SPIE, vol. 3798, Jul. 1999, pp. 76–84.

J. Shirk et al., "Optical Limiter Using a Lead Phthalocyanine," App. Phys Lett., vol. 63, No. 4, Oct. 1993, pp. 1880–1882.

L. Tutt et al., "A Review of Optical Limiting Mechanisms and Devices Using Organics, Fullerenes, Semiconductors and Other Materials," Prog. Quant. Elect., 1993, vol. 17, pp. 299–338.

Joseph W. Perry et al., "Enhanced Reverse Saturable Absorption and Optical Limiting in Heavy–atom–substituted Phthalocyanines," Optics Letters, May 1994, vol. 19, No. 9, pp. 625–627.

V. I. Klimov et al., "Femtosecond High–Sensitivity, Chirp–Free Transient Absorption Spectroscopy Using Kilohertz Lasers," Optics Letters, Feb. 1998, vol. 23, No. 4, pp. 277–279.

F. M. Qureshi et al., "Optical Limiting Properties of a Zinc Porphyrin Polymer and its Dimer and Monomer Model Compounds," Chemical Physics, vol. 231, (1998), pp. 87–94.

Chengyou Liu et al., "Optical Limiting Performance of a Novel σπ Alternating Polymer," Optics Communications, vol. 162, (1999), pp. 53–56.

* cited by examiner

*Primary Examiner*—Cynthia H. Kelly
*Assistant Examiner*—C S Thompson
(74) *Attorney, Agent, or Firm*—Samuel L. Borkowsky (57) ABSTRACT

Optical limiting device and method of preparation thereof. The optical limiting device includes a transparent substrate and at least one homogeneous layer of an RSA material in polyvinylbutyral attached to the substrate. The device may be produced by preparing a solution of an RSA material, preferably a metallophthalocyanine complex, and a solution of polyvinylbutyral, and then mixing the two solutions together to remove air bubbles. The resulting solution is layered onto the substrate and the solvent is evaporated. The method can be used to produce a dual tandem optical limiting device.

30 Claims, 5 Drawing Sheets

OPTICAL LIMITING DEVICE AND METHOD OF PREPARATION THEREOF

STATEMENT REGARDING FEDERAL RIGHTS

This invention was made with government support under Contract No. W-7405-ENG-36 awarded by the U.S. Department of Energy. The government has certain rights in the invention.

FIELD OF THE INVENTION

The present invention relates generally to optical limiting devices and more particularly to a solid-state optical limiting device and to a method for preparing the device.

BACKGROUND OF THE INVENTION

Optical sensors are important, light sensitive devices that are used in light detection. They can, however, be damaged if they are exposed to a high enough intensity of light. Dynamic and passive forms of optical sensor protection are known. One form of sensor protection may include, for example, special glasses that a welder uses to protect the welder's eyes from the high intensity light generated by the welder's arc. Another form of sensor protection may include an optical sensor that can sense high intensity light and communicate electronically to an actuator to block at least some of the light, thereby reducing its intensity and minimizing damage to the sensor.

Optical limiting devices placed between the light source and the sensor can provide the sensor with protection from high intensity light. These protective devices absorb or scatter high intensity light while transmitting low intensity light from the light source to the sensor. Since no communication from the sensor or from any other device is required for optical limiting devices to become active, they provide a type of "smart" protection; they are always active, and they respond almost instantly to high intensity light. The increased speed is particularly important for applications where the sensor may be exposed to sudden bursts of high intensity light. Optical limiting devices are used, for example, to protect optical sensors in pulsed laser systems.

Optical limiting devices have been recently reviewed by Lee W. Tutt, et. al. in "A Review of Optical Limiting Mechanisms and Devices Using Organics, Fullerenes, Semiconductors, and Other Materials, Prog. Quant. Electr, 1993, vol. 17, pp. 299–338, hereby incorporated by reference. A subset of devices described therein employ optically sensitive materials that exhibit an accumulative optical absorption effect known as "reverse saturable absorption" (RSA). The RSA effect, first reported by C. R. Guiliano and L. D. Hess in IEEE Journal of Quantum Electronics, 1967, vol. 3, p. 358, was discovered when various dye molecules did not bleach, i.e. become more transparent, when exposed to high intensity light but instead became less transparent.

The RSA effect for dye molecules arises when the excited state absorption cross-sections for the molecules are larger than the ground state absorption cross-sections. As these types of molecules absorb light, their first excited state populations increase and contribute to the total absorption cross-section. Since the first excited state cross-section is larger than the ground state cross-section for an RSA absorber, the total absorption increases as the excited state becomes more populated and the molecules become less transparent as they absorb light. In contrast, "saturable absorbers" are molecules having a first excited state cross-section that is smaller than the ground state cross-section. When these types of molecules absorb light, they bleach, i.e. they become more transparent to light.

A wide variety of materials potentially usable as optical limiting materials have been tested. These materials include transition metal cluster compounds, such as iron carbonyl cluster compounds reported in U.S. Pat. No. 5,283,697 to L. W. Tutt et al., which were blended into a polymer to provide an optical limiting device. They also include fullerenes, described in U.S. Pat. No. 5,391,329 to T. K. Dougherty et al. in "Process for Making a Solid Optical Limiter Containing a Graded Distribution of Reverse Saturable Material", and in U.S. Pat. No. 5,741,442 to D. W. McBranch et al. entitled "Optical Limiting Materials". The strongest RSA effects to date have been observed for metalloporphyrin and metallophthalocyanine complexes, e.g. lead tetrakis(4-cumylphenoxy) phthalocyanine. For example, see J. S. Shirk et al., "Optical Limiter Using a Lead Phthalocyanine", Appl. Phys. Lett. (63)14, 1993, pp. 1880–1882; and U.S. Pat. No. 5,805,326 to A. W. Snow et al. entitled "Optical Limiter Structure and Method". Some of these complexes were dissolved in (poly(methylmethacrylate)) (PMMA) and in polystyrene to provide "optical limiter structures". While these structures can be used as high intensity light attenuators, they are also subject to damage from high intensity light.

Thus, there remains a need for optical limiting devices with superior properties. Therefore, an object of the present invention is to provide a method for preparing optical limiting devices that exhibit a strong RSA effect and less subject to damage from high intensity light than known devices.

Yet another object of the invention is to provide an optical limiting device with a strong RSA effect and less subject to damage from high intensity light than known devices.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

In accordance with the purposes of the present invention, as embodied and broadly described herein, the present invention includes a method of preparing an optical limiting device, comprising the steps of dissolving an RSA material having reverse saturable absorption properties in a first solvent to produce a first solution; dissolving polyvinylbutyral into a second solvent to produce a second solution; mixing the solutions together to produce a third solution and stirring the third solution to remove air bubbles therefrom; layering the third solution onto one side of a transparent substrate; and evaporating the solvent from the third solution to produce a solid layer of polyvinylbutyral/RSA material that is adhered to the substrate and thereby form the optical limiting device.

The invention also includes a method of forming an optical limiting device, comprising the steps of dissolving an RSA material having reversible saturable absorption properties in a first solvent to produce a first solution; dissolving polyvinylbutyral into a second solvent to produce a second solution; mixing the solutions together to produce a third solution and stirring the third solution to remove air bubbles therefrom; layering a portion of the third solution onto one side of a transparent substrate; evaporating the evaporating the solvent from the third solution produce a first solid layer of polymer/material that is adhered to the substrate; layering another portion of the third solution onto another side of the substrate plate; and evaporating the solvent from-other portion to produce a second solid layer of polymer/RSA material having reversible saturable absorption properties that is adhered to the substrate and thereby form the optical limiting device.

The invention also includes an optical-limiting device produced by the method of preparing an optical limiting device, comprising the steps of dissolving an RSA material having reverse saturable absorption properties in a first solvent to produce a first solution; dissolving polyvinylbutyral into a second solvent to produce a second solution; mixing the solutions together to produce a third solution and stirring the third solution to remove air bubbles therefrom; layering the third solution onto one side of a transparent substrate; and evaporating the solvent from the third solution to produce a solid layer of polyvinylbutyral/RSA material that is adhered to the substrate and thereby form the optical limiting device.

The invention also includes optical limiting device comprising a transparent substrate and a layer comprising a homogeneous mixture of an RSA material and polyvinylbutyral, the layer being attached to the substrate.

The invention also includes an optical limiting device comprising a transparent substrate comprising a first substrate surface and a second substrate surface; a first layer comprising a homogeneous mixture of an RSA material and polyvinylbutyral, the.first layer being attached to the first substrate surface; and a second layer comprising a second homogeneous mixture of a second an RSA material and polyvinylbutyral, the second layer being attached to the second substrate surface.

BRIEF DESCRIPTION OF THE DRAWINGS

The accompanying drawings, which are incorporated in and form a part of the specification, illustrate the embodiment(s) of the present invention and, together with the description, serve to explain the principles of the invention. In the drawings.

DETAILED DESCRIPTION OF THE INVENTION

The present invention includes an optical limiting device and a method of preparing it. One embodiment of the invention is a type of device known as a "dual tandem optical limiting device". The performance of such a device was described by S. Xu et al. in "Toward the Development of Solid-State Optical Limiting Devices", SPIE, July 1999, Vol. 3738, pp. 76–84, hereby incorporated by reference. This dual tandem optical limiting device includes a thin cell or film of a metallophthalocyanine and a glass spacer. The device described in Xu et al. exhibited excellent properties. The maximum attenuation, for example, for the devices described in Xu et al. was about 400× with a linear transmission of 65% and a damage threshold up to about 3 mJ. While specific examples of metallophthalocyanines were disclosed, the method used to prepare the device was not disclosed and the exact composition of the device, particularly the polymer matrix employed and the type of glass used were not described. Furthermore, the maximum damage threshold for optical limiting devices of the present invention have been increased to about 10 mJ, more than threefold higher as compared to Xu et al.

Figure 1:
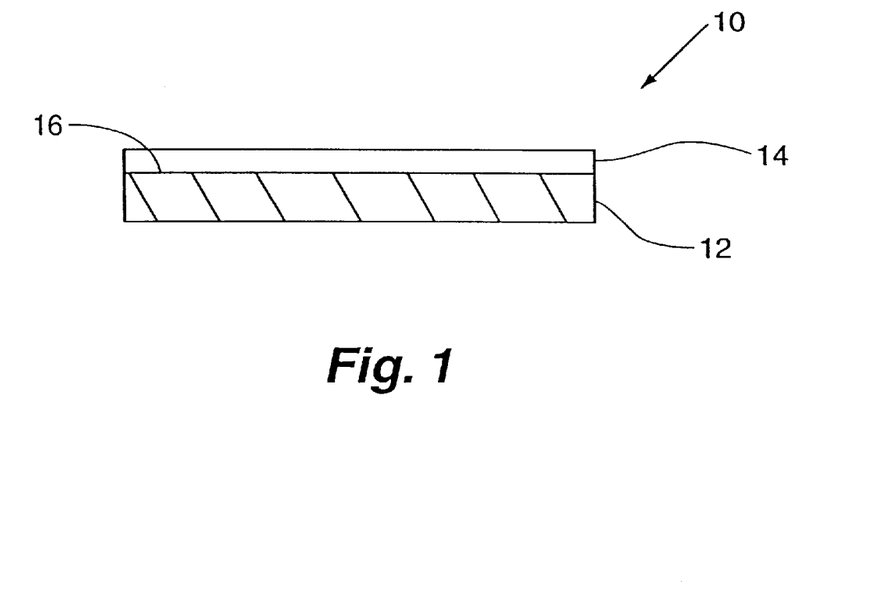
FIG. 1 shows a cross-sectional view of an embodiment of an optical limiting device of the present invention.

The invention can be further understood with the accompanying figures. Similar or identical structure is identified using identical callouts. Turning to the Figures, FIG. 1 shows a cross-sectional view of an embodiment of an optical limiting device prepared when one side of a plate of fused silica is layered with the polymer/metallophthalocyanine mixture. FIG. 1 shows an embodiment of an optical limiting device 10 having a substantially flat, transparent, fused silica plate 12 with a layer 14 of a metallophthalocyanine complex homogeneously dispersed within a solid polymer attached to surface 16 of plate 12.

Figure 2:
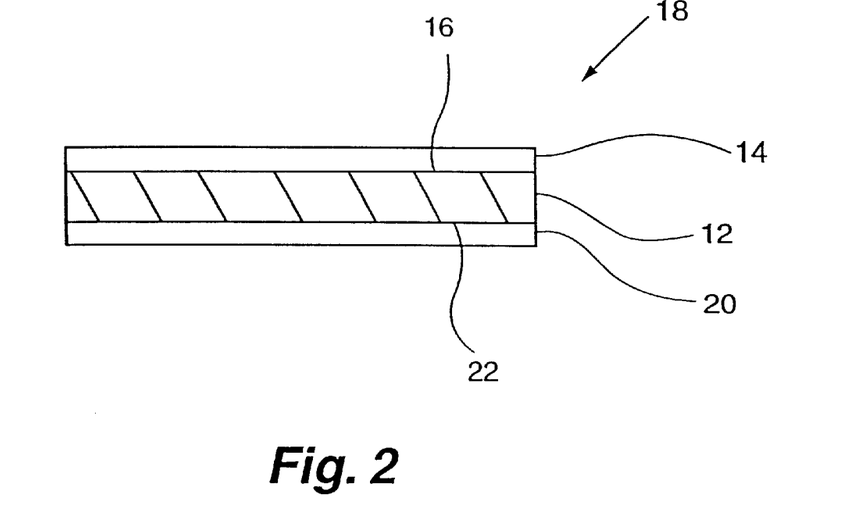
FIG. 2 shows a cross-sectional view of a dual tandem optical limiting device of the present invention.

FIG. 2 shows a cross-sectional view of an embodiment of a tandem optical limiting device prepared using the method of the invention, where two sides of a glass plate are layered with the polymer/metallophthalocyanine mixture. FIG. 2 shows device 18, which includes fused silica plate 12, a first layer 14 of the complex dispersed in polymer attached to flat surface 16 of fused silica plate 12, and a second layer 20 of the complex dispersed in polymer attached to the other flat surface 22 on the opposite side of the plate.

The optical limiter of the present invention is prepared by a casting procedure that involves preparing a solution of a metallophthalocyanine, preparing a solution of a polymer, mixing the two solutions together, and stirring to homogenize the solutions and ensure that no air bubbles are present. The resulting bubble-free solution is layered onto a surface of a substantially flat, transparent, plate of fused silica. The solvent is evaporated to produce an optical limiting device of the invention. The bubble free solution may be layered onto the other surface of the plate to produce a tandem optical limiting device of the invention.

The choices of plate material and polymer are particularly important in producing a thin-film optical limiting device with a high linear transmission, preferably between about 30–85%, more preferably between about 50–70%, and most preferably between about 60–65%. Further, the optical limiting device of the invention provides a high attenuation, even greater than 400×, and a high damage threshold (up to about 10 mJ). The optimum plate material is made from fused silica. Fused silica plates (3 inches in diameter) that were used to prepare optical limiting devices of the present invention were obtained commercially from Sierra Precision Optics.

The choice of polymer was particular important. While gel matrices and polymer matrices of poly (methylmethacrylate) (PMMA) and polycarbonate (PC) have all been used in the fabrication of optical limiting devices, attempts at casting these matrices into thin films did not result in the production of high performance optical limiting devices. These matrices produced brittle films of low optical quality. Attempts at preparing high quality thin films (about 150–450 mm in thickness) using metallophthalocyanine complexes dissolved in PMMA and PC matrices produced cloudy films. Furthermore, low miscibility between a metallophthalocyanine complex and PMMA or PC polymer results in phase separation of the polymer matrix from the metallophthalocyanine complex for concentrations of the complex that allow the production of a device with reasonable attenuation properties. The matrix that produced a high quality thin film of a dissolved metallothiocyanine complex from a casting procedure, and was subsequently used in the production of a high performance optical limiting device was a polyvinylbutyral matrix.

A particular example of an optical limiting device of the present invention was prepared by first preparing of a solution of poly(vinylbutyral) (PVB, 1.022 g) in tetrahydrofuran (THF, 2.83 g) solvent and stirring the resulting solution for about 2 h. A solution of lead tetrakis(4-cumylphenoxy) phthalocyanine (OL1, 6.2 mg) in THF (2.6 g) solvent was also prepared, stirred for 2 h, and filtered through a 0.2 micron Teflon filter. The OL1 solution was added to the PVB solution and the resulting solution was stirred for about 1 h, after which no bubbles were apparent, and then poured onto one side of a circular fused silica glass plate three inches in diameter. The solvent was allowed to evaporate to produce an attached film of OL1/PVB with a film thickness of about 300 microns. The OL1/PVB solution prepared again and then poured onto the other side of the plate. The solvent was evaporated to provide a dual tandem optical limiting device of the present invention.

The step of filtering the metallophthalocyanine solution insures that no solid particles of the complex are present in the resulting film. Also, instead of preparing two OL1/PVB solutions, one solution of OL1/PVB solution can be prepared using twice the amount of PVB, OL1, and solvent. The concentrations of PVB and OL1 would be unchanged, and half of the resulting OL1/PVB solution can be measured out and poured onto one side of the plate, and the remaining half poured onto the other side to form an identical dual tandem optical limiting device of the present invention.

Figure 3:
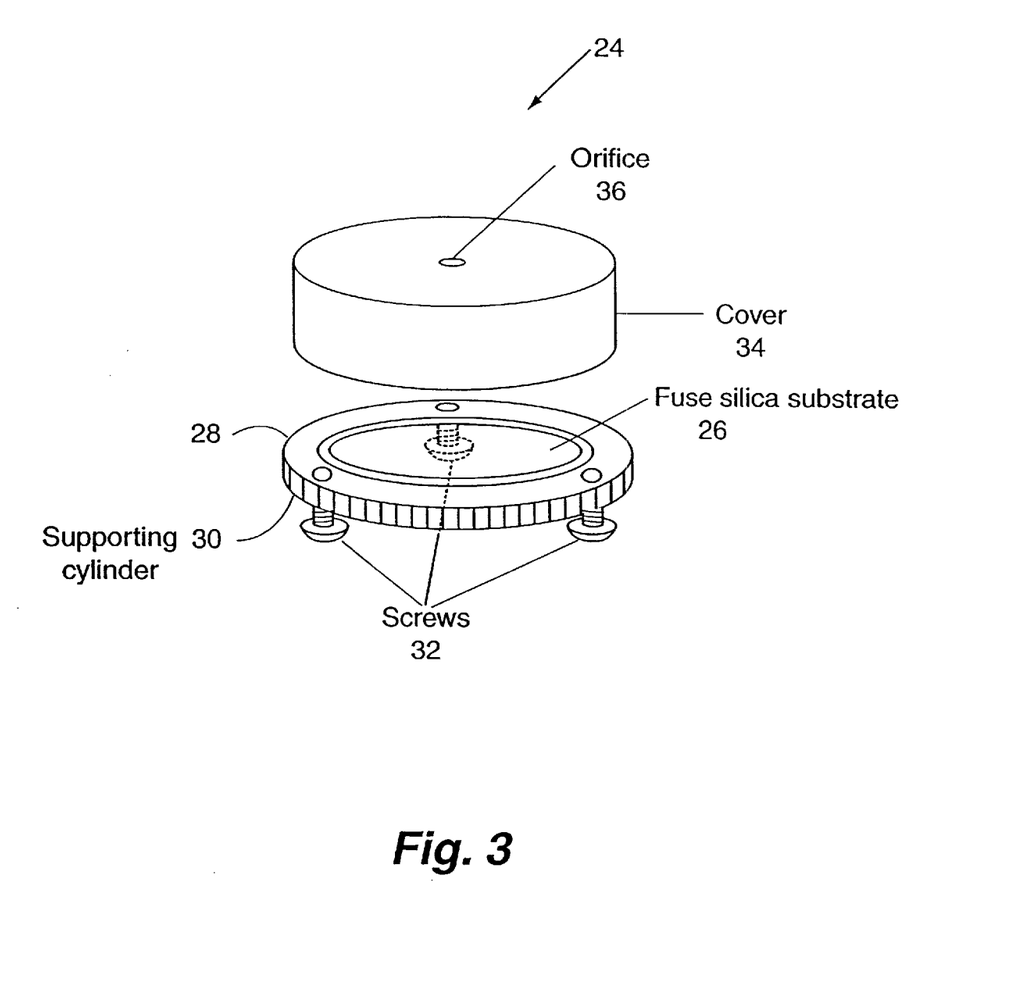
FIG. 3 shows an apparatus used to produce films of uniform thickness and regulate the rate of evaporation of solvent from a solvent/polymer/metallophthalocyanine mixture layered onto a substrate.

A relatively slow rate of evaporation produced the highest performance films. The evaporation rate can be adjusted by placing a cover having a small orifice over the substrate after the polymer/metallophthalocyanine solution is layered onto the substrate surface. As the solvent evaporates, it fills the volume between the substrate and the cover and slowly exits the cover through the orifice. FIG. 3 shows a schematic representation of the evaporation apparatus 24. Fused silica substrate 26 in the form of a disk is leveled with leveling apparatus 28. Leveling apparatus 28 includes a cylinder 30 that supports substrate 26. Apparatus 24 also includes leveling screws 32 that are adjusted with the aid of a level (not shown) to ensure that the film thickness is the same across the surface of the substrate. Apparatus 24 also includes cover 34 having a small orifice 36 for solvent to escape after the solution of polymer/metallophthalocyanine is layered onto the substrate.

Figure 4:
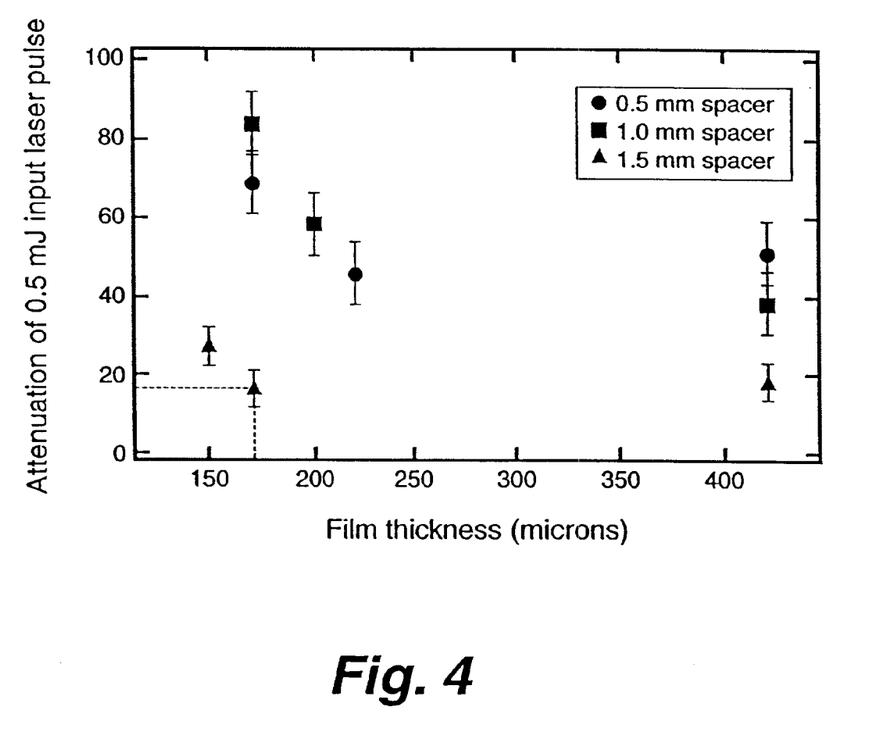
FIG. 4 shows a graphical representation of the attenuation of intensity of light as a function of the plate thickness of the device of the present invention.

The film of the invention is a thin film with a thickness of about 50–600 microns. The plate thickness was varied to determine the optimum thickness for an optical limiter of the invention. FIG. 4 shows a graphical representation of the attenuation of intensity of light as a function of the film thickness for a fused silica plate. Plate thickness in microns is plotted on the x-axis, while the attenuation (i.e. the ratio of the intensity of incoming light divided by the intensity of outgoing light) of an incident 0.5 mJ laser pulse is plotted on the y-axis. Three different plate thicknesses, 0.5 mm, 1.0 mm, and 1.5 mm were examined. For a plate thickness of 1.5 mm, for example, FIG. 4 shows that a film thickness of about 170 microns produces an attenuation of about 16. As FIG. 4 shows, a plate thickness of 1.0 mm provided the optimum attenuation.

Figure 5:
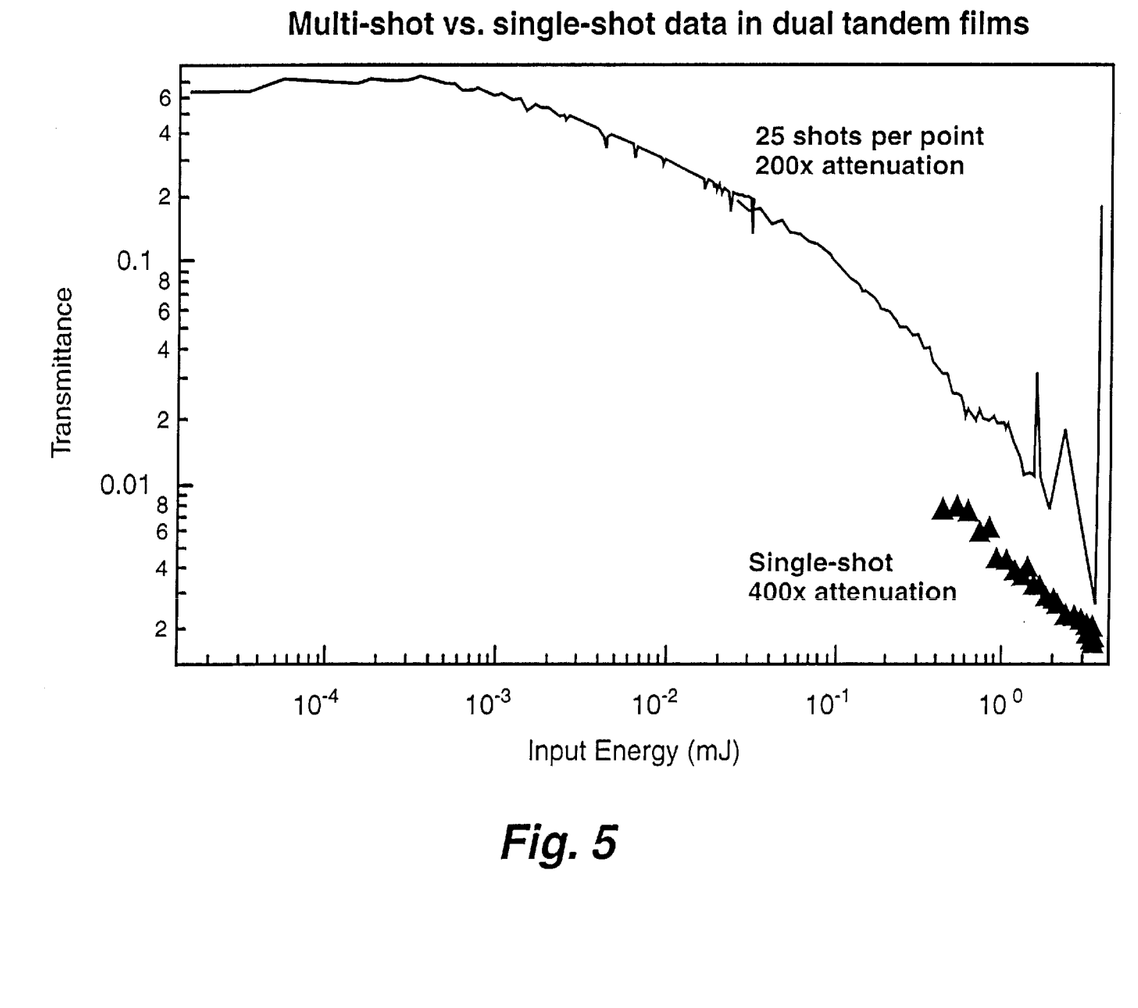
FIG. 5 shows a graphical representation of transmittance of the device vs. input energy for multi-shot and single shot data.

The optical properties of dual tandem optical limiting devices prepared using lead tetrakis(4-cumylphenoxy) phthalocyanine were examined using transient absorption (TA) spectroscopy to determine the spectral characteristics and dynamics of excited-state absorption leading to RSA. Broadband, 150 femtosecond (fs) pulses at a 1 kilohertz (kHz) repetition rate were generated using an amplified Ti:sapphire laser, and the TA was measured using a standard pump/probe geometry. Also, chirp-free absorption spectra (see V. Klimov et al. in "Femtosecond high-sensitivity, chirp-free transient absorption spectroscopy", Appl. Opt., vol. 23, p. 277, 1998, hereby incorporated by reference) were measured for the optical limiting device in the range from 450–800 nm. Nanosecond fluence-dependent transmittance measurements were performed to quantify the optical limiting performance, where a 6 nanosecond Nd:YAG laser/optical parametric oscillator was used to generate optimal wavelength for the dual tandem optical limiting device. Fluence-dependent transmittance was measured both at fixed focal position by varying the incident energy, or by scanning the device along the beam (z-scan) at fixed incident energy. Two focal geometries were used: f/12.5 and f/5. FIG. 5 shows a graphical representation of the transmittance versus input energy for a dual tandem optical limiting device of the present invention. The curved line of FIG. 5 describes data obtained for multi-shot mode, i.e. where a single point of the device is subjected to a succession of light pulses of varying intensity. In this case, a pulsed laser source provided 25 pulses at a single point in the device. As the curve shows, the transmittance of the device is a maximum of about 65% when the input energy, i.e. the energy of the laser light pulses, is less than about $10^{-3}$ millijoules (mJ). As the pulse energy increases, the transmittance decreases until the input energy is so great that repeated pulsing damages the device, whereupon subsequent input pulsing does not reduce the transmittance. The maximum observed attenuation for the pulse-repeat mode is about 200×.

Figure 6:
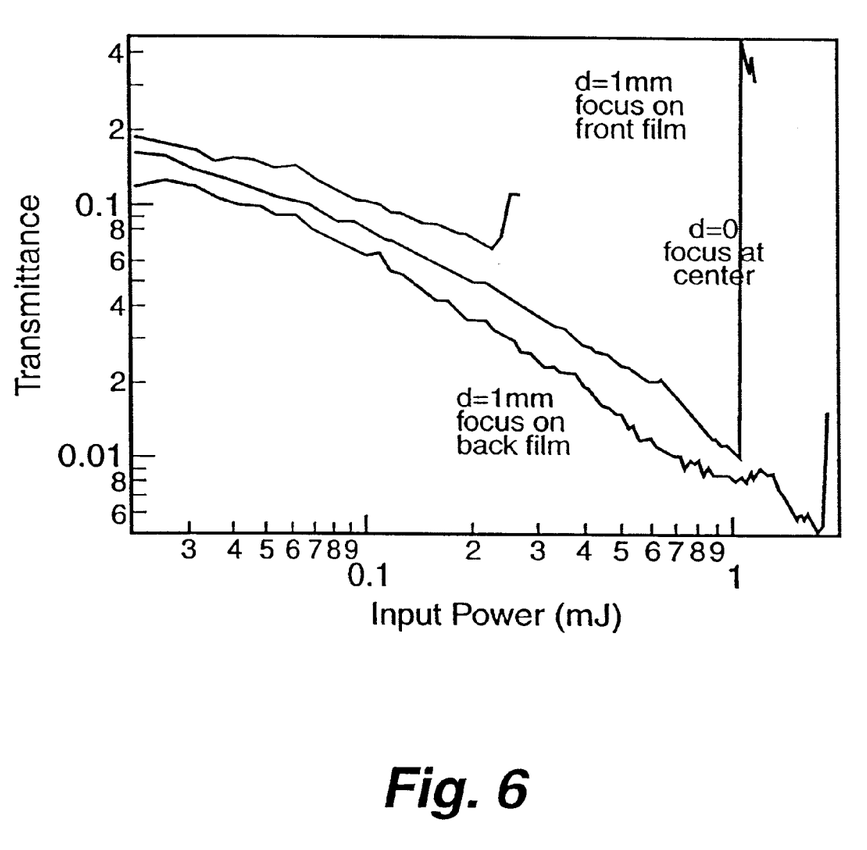
FIG. 6 shows a graphical representation of the effect of beam focus position of the performance of the device of the present invention.

Additional data are plotted in the form of triangles on the lower right side of FIG. 5. Each triangle represents data from a single shot, i.e. from a single laser pulse of relatively high intensity. As FIG. 6 shows, the device of the present invention can withstand single pulses of relatively high intensity without sustaining damage, and a maximum attenuation for single-shot data of about 400× at f/5 focusing was observed.

For a dual tandem optical limiting device of the present invention, the input beam passes through the front film and should be focused on the back film. FIG. 6 is a graphical representation showing the effect of beam focus position on the performance of the device. The transmittance of the device is plotted versus input power in mJ. A comparison of FIG. 6 with FIG. 5 reveals that FIG. 6 includes the high-energy portion of FIG. 5. As FIG. 5 shows, transmittance is lowest and the device can sustain the maximum input before failure when the beam focus is directed at the back film.

Other metallophthalocyanines were used to provide additional optical limiters of the invention. Another optical limiter, for example, was prepared by first preparing a solution of PVB (0.793 g) in THF (2.30 g) solvent and stirring for 2 h. A solution of zinc 2,9,16,23-tetratertbutyl-29H,31H-phthalocyanine (OL2, 6.7 mg) in THF (2.5 g)

solvent was also prepared, stirred for 2 h, and filtered through a 0.2 micron teflon filter. The OL2 solution was added to the PVB solution and the resulting solution was stirred for about 1 h, no bubbles were apparent, and was then poured onto a fused silica plate 3 inches in diameter. The solvent was allowed to evaporate to produce an optical limiting device having a thin film (about 300 microns thick) of PVB/OL2.

Additional metallophthalocyanines that can also be used with the invention have been described, for example, in aforementioned U.S. Pat. No. 5,805,326 to A. W. Snow et al.; in "Inorganic Chemistry" by F. Albert Cotton et al., $6^{th}$ ed., John Wiley & Sons (1999) and references therein; and in "Inorganic Chemistry: Principles of Structure and Reactivity" by James E. Huheey et al., $4^{th}$ edition, Addison-Wesley Publishing Co., (1993) and references therein.

While only a limited number of examples of optical limiters, substrates, and solvents, it should be understood that any RSA material, i.e. a material that exhibits RSA properties can be used if that RSA material can be dissolved in a solvent to produce a solution that is soluble in a solution of polyvinylbutyral. Thus, while metallophthalocyanines are particularly good examples of RSA materials, other types of RSA materials can also be used. Further, while fused silica is a particularly good substrate material, other substrate materials can also be used. In addition, it should also be understood that the substrate need not be limited to one with flat surfaces, as curved substrates should also provide optical limiting devices of the present invention. Lenses and holographic gratings, for example, can be provided with RSA/polyvinylbutyral films to produce optical limiting devices according the present invention.

Since the optical limiting device of the present invention includes thin films on a substrate, the invention can be used to produce a wide variety of optical limiting devices by retrofitting many types of existing optical systems that include, for example, laser goggles, night-vision goggles, binoculars, special sensor protectors, video cameras, periscopes and the like. The retrofitted systems would have a relatively high transmittance that would decrease rapidly so that the user is not blinded by high intensity light. As the light intensity decreases, the transmittance of the system would then increase quickly.

The foregoing description of the invention has been presented for purposes of illustration and description and is not intended to be exhaustive or to limit the invention to the precise form disclosed, and obviously many modifications and variations are possible in light of the above teaching.

The embodiment(s) were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. An optical-limiting device produced by the method of preparing an optical limiting device, comprising the steps of:
    (a) dissolving an RSA material having reverse saturable absorption properties in a first solvent to produce a first solution;
    (b) dissolving polyvinylbutyral into a second solvent to produce a second solution;
    (c) mixing said first solution and said second solution together to produce a third solution and stirring said third solution to remove air bubbles therefrom;
    (d) layering said third solution onto one side of a transparent substrate; and
    (e) evaporating the solvent from said third solution to produce a solid layer of polyvinylbutyral/RSA material comprising a thickness of about 50–600 microns that is adhered to the substrate and thereby form the optical limiting device.

2. The device of claim 1, wherein said RSA material comprises a metallophthalocyanine complex.

3. The device of claim 1, wherein said metallophthalocyanine complex comprises a lead-phthalocyanine complex.

4. The device of claim 1, wherein said first solvent and said second solvent comprise tetrahydrofuran or chloroform.

5. The device of claim 1, wherein said transparent substrate comprises a fused silica substrate.

6. The device of claim 1, wherein said transparent substrate comprises a flat substrate.

7. The device of claim 1, wherein said transparent substrate comprises a curved substrate.

8. The device of claim 1, wherein said substrate comprises a thickness of about 0.5–1.5 millimeters.

9. The device of claim 1, wherein said step of dissolving the RSA material in a first solvent comprises preparing a saturated solution by mixing the RSA material with the first solvent and then filtering the solution to remove undissolved RSA material.

10. The device of claim 1 made by the method further comprising the steps of:
    (f) dissolving a second RSA material having reverse saturable absorption properties in a solvent to produce a fourth solution;
    (g) preparing another solution of polyvinylbutyral;
    (h) mixing said fourth solution with the polyvinylbutyral solution together to produce a fifth solution and stirring the fifth solution to remove air bubbles therefrom;
    (i) layering said fifth solution onto another side of the transparent substrate; and
    (j) evaporating the solvent from said fifth solution to produce a second solid layer of polyvinylbutyral/RSA material adhered to the substrate and thereby form the optical limiting device.

11. The device of claim 10, wherein said RSA material of the first layer and said RSA material of the second layer are the same RSA material.

12. The device of claim 10, wherein said RSA material of the first layer and said RSA material of the second layer are different RSA materials.

13. An optical limiting device comprising:
    (a) a transparent substrate;
    (b) a layer comprising a homogeneous mixture of an RSA material and polyvinylbutyral, said layer being attached to the substrate.

14. The device of claim 13, wherein said RSA material comprises a metallophthalocyanine complex.

15. The device of claim 13, wherein said metallophthalocyanine complex comprises a lead-phthalocyanine complex.

16. The device of claim 13, wherein said transparent substrate comprises a fused silica substrate.

17. The device of claim 13, wherein said substrate is a flat substrate.

18. The device of claim 13, wherein said substrate is a curved substrate.

19. The device of claim 13, wherein said substrate has a thickness of about 0.5–1.5 millimeters.

20. The device of claim 13, wherein said layer of polyvinylbutyral/RSA material comprises a thickness of about 50–600 microns.

21. An optical limiting device comprising:
(a) a transparent substrate comprising a first substrate surface and a second substrate surface;
(b) a first layer comprising a homogeneous mixture of an RSA material and polyvinylbutyral, said layer being attached to said first substrate surface; and
(c) a second layer comprising a second homogeneous mixture of a second RSA material and polyvinylbutyral, said second layer being attached to said second substrate surface.

22. The device of claim 21, wherein said first RSA material comprises a metallophthalocyanine complex.

23. The device of claim 21, wherein said second RSA material comprises a metallophthalocyanine complex.

24. The device of claim 21, wherein said first RSA material comprises a lead-phthalocyanine complex.

25. The device of claim 21, wherein said second RSA material comprises a lead-phthalocyanine complex.

26. The device of claim 21, wherein said transparent substrate comprises a fused silica substrate.

27. The device of claim 21, wherein said substrate comprises a flat substrate.

28. The device of claim 21, wherein said substrate comprises a curved substrate.

29. The device of claim 21, wherein said substrate comprises a thickness of about 0.5–1.5 millimeters.

30. The device of claim 21, wherein said first layer and said second layer of polyvinylbutyral/RSA material each comprise a thickness of about 50–600 microns.

* * * * *